(12) United States Patent
Matsushita

(10) Patent No.: US 9,979,541 B2
(45) Date of Patent: May 22, 2018

(54) CONTENT MANAGEMENT SYSTEM, HOST DEVICE AND CONTENT KEY ACCESS METHOD

(71) Applicant: KABUSHIKI KAISHA TOSHIBA, Tokyo (JP)

(72) Inventor: Ken Matsushita, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 155 days.

(21) Appl. No.: 15/010,586

(22) Filed: Jan. 29, 2016

(65) Prior Publication Data

US 2016/0156468 A1 Jun. 2, 2016

Related U.S. Application Data

(63) Continuation of application No. PCT/JP2013/081372, filed on Nov. 21, 2013.

(51) Int. Cl.
*H04L 9/08* (2006.01)
*G06F 21/62* (2013.01)
*G06F 21/78* (2013.01)

(52) U.S. Cl.
CPC ........ *H04L 9/0897* (2013.01); *G06F 21/6218* (2013.01); *G06F 21/78* (2013.01); *H04L 9/085* (2013.01); *H04L 9/0877* (2013.01); *G06F 2221/2107* (2013.01); *H04L 2209/60* (2013.01)

(58) Field of Classification Search
CPC ...... H04L 9/0897; H04L 9/085; H04L 9/0877
See application file for complete search history.

(56) References Cited

U.S. PATENT DOCUMENTS 8,520,855 B1 * 8/2013 Kohno .................. G06F 21/602
380/259
2006/0168451 A1 * 7/2006 Ishibashi ................. G06F 21/10
713/176
2007/0043667 A1 2/2007 Qawami et al.
(Continued)

FOREIGN PATENT DOCUMENTS

JP 2005-354602 A 12/2005
JP 2008-113172 A 5/2008
(Continued)

OTHER PUBLICATIONS

Yamanaka et al. "Copyright Protection in Muitimedia on Demand Services," NTT R&D, Sep. 10, 1995, vol. 44, No. 9, pp. 813-818 (with English Abstract).

*Primary Examiner* — Morshed Mehedi
(74) *Attorney, Agent, or Firm* — Foley & Lardner LLP

(57) ABSTRACT

According to one embodiment, a content key is split into split content keys and separately stored in a plurality of regions in a protected region of a memory device. Then, a common key is generated between the host device and the memory device, and encryption keys are cut out from the common key. When the split content keys are read from the memory device and transmitted to the host device, the split content keys are encrypted with the encryption keys and then decrypted with the encryption keys on the host device side. Subsequently, the split content keys decrypted with the encryption keys on the host side are combined with each other, and the original content key is thereby obtained. Finally, the content is decrypted with the content key.

9 Claims, 4 Drawing Sheets

(56) References Cited

U.S. PATENT DOCUMENTS

| | | |
|---|---|---|
| 2008/0235517 A1 | 9/2008 | Ohmori et al. |
| 2008/0260157 A1 | 10/2008 | Yamauchi |
| 2008/0307217 A1 | 12/2008 | Yukimatsu et al. |
| 2009/0100264 A1 | 4/2009 | Futa et al. |
| 2009/0154703 A1* | 6/2009 | Price ............... H04L 9/0897 380/277 |
| 2009/0210722 A1* | 8/2009 | Russo ............... H04L 9/0866 713/189 |
| 2010/0268953 A1 | 10/2010 | Matsukawa et al. |
| 2013/0044881 A1* | 2/2013 | Chang ............... H04L 9/0819 380/278 |
| 2013/0070922 A1* | 3/2013 | Helms ............... H04L 9/0825 380/200 |
| 2014/0140508 A1* | 5/2014 | Kamath ............. H04L 9/0822 380/255 |
| 2014/0233740 A1* | 8/2014 | Niamut .............. H04L 9/3013 380/279 |

FOREIGN PATENT DOCUMENTS

| | | |
|---|---|---|
| JP | 2009-508412 A | 2/2009 |
| JP | 2010-268417 A | 11/2010 |
| WO | WO-2005/099168 A2 | 10/2005 |
| WO | WO-2007/013611 A1 | 2/2007 |
| WO | WO-2007/030760 A2 | 3/2007 |
| WO | WO-2007/125877 A1 | 11/2007 |

\* cited by examiner

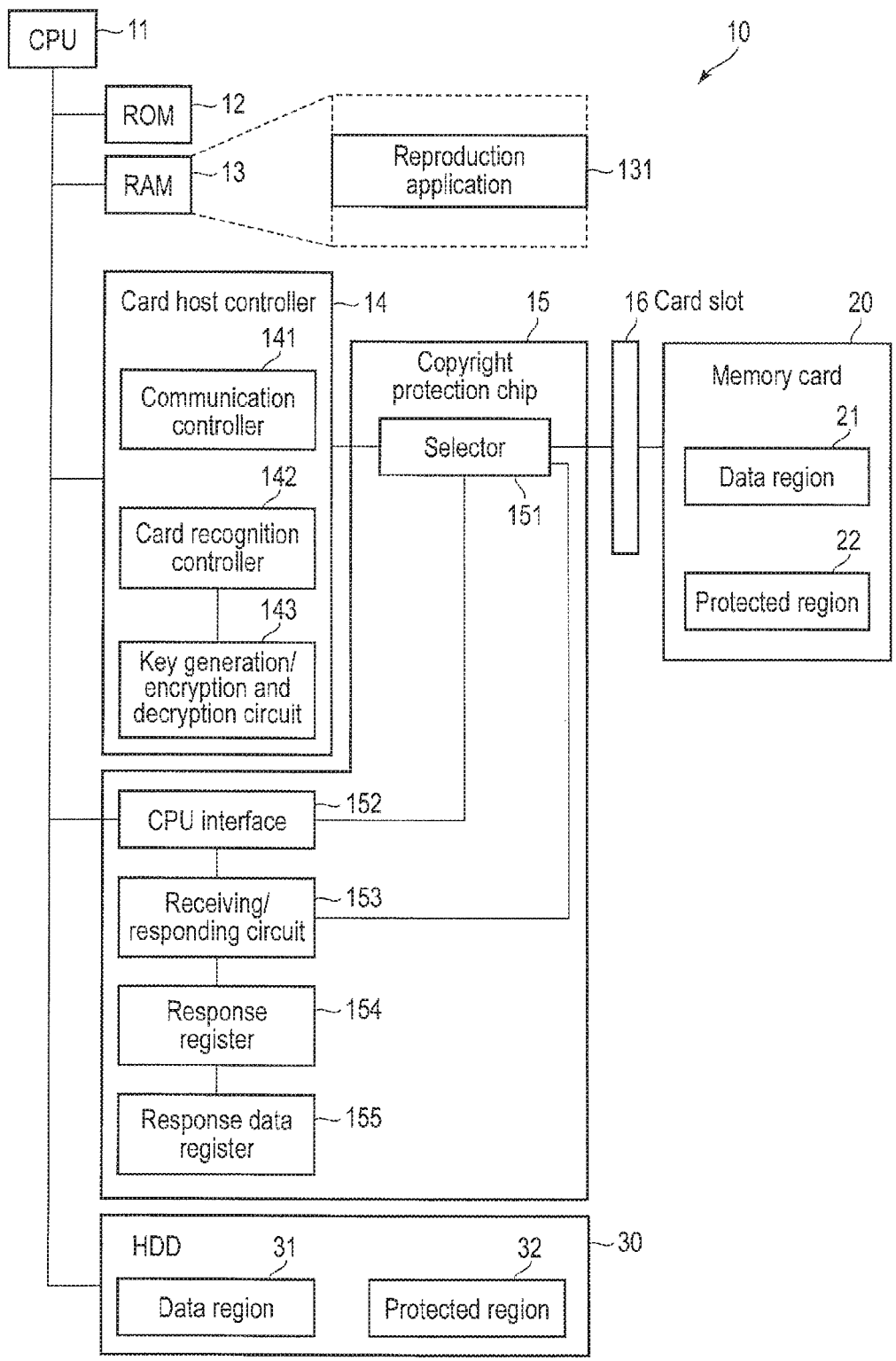
F I G. 1

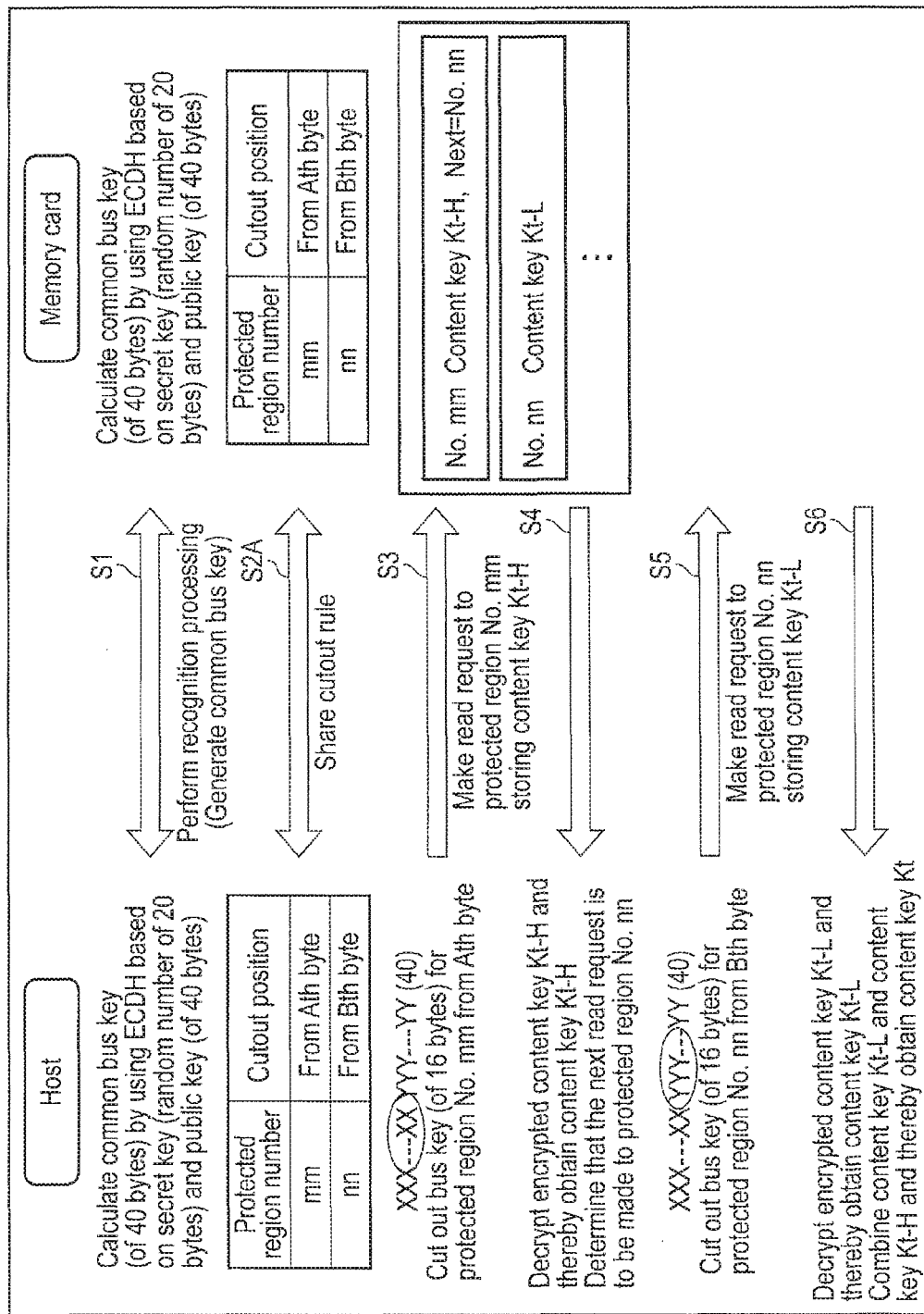
F I G. 3

CONTENT MANAGEMENT SYSTEM, HOST DEVICE AND CONTENT KEY ACCESS METHOD

CROSS REFERENCE TO RELATED APPLICATIONS

This application is a Continuation Application of PCT Application No. PCT/JP2013/081372, filed Nov. 21, 2013, the entire contents of which are incorporated herein by reference.

FIELD

Embodiments described herein relate generally to a content management system, a host device and a content key access method for managing content by encrypting the content with a content key.

BACKGROUND

Recently, in video reproduction technology, high-definition content such as 4K content has been developed. Along with the development of high-definition content, content management systems for managing content keys and content encrypted with the content keys in combination are required to have higher encryption strength by using longer content keys and the like as well as higher access security by adopting more complex content key access methods.

In particular, according to conventional encryption key generation methods, even if there are several protected regions in a memory for storing a content key, the content key is simply stored in a specific single protected region. Further, when a host device reads the content key, the content key is exchanged in an encrypted state, but the content key is simply encrypted with a content encryption key which is cut out from a specific fixed portion of a common bus key obtained beforehand in authentication processing between the host device and the memory (such as an SD card). Therefore, the access security needs to be further improved.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a block diagram schematically showing an example of a content management system of an embodiment.

FIG. 3 is a sequence diagram showing a content key access method of the second embodiment in the system of FIG. 1.

DETAILED DESCRIPTION

Figure 2:
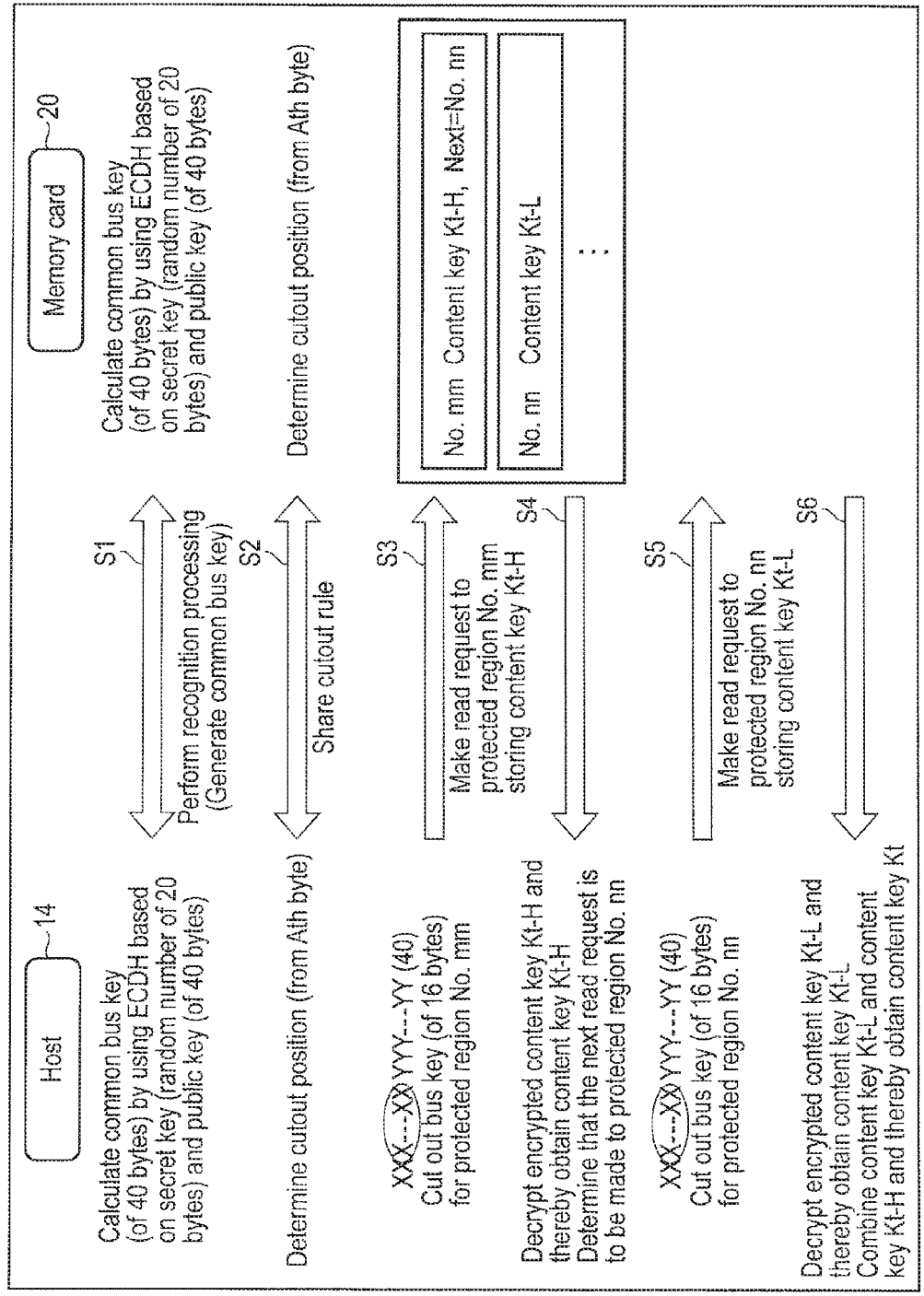
FIG. 2 is a sequence diagram showing a content key access method of the first embodiment in the system of FIG. 1.

Various embodiments will be described hereinafter with reference to the accompanying drawings.

In general, according to one embodiment, there are provided a content management system comprises a memory device comprising a memory to store a content key used for encryption of content in a protected region of the memory; and a host device connected to the memory device and configured to read out the content key from the memory. The memory device is configured to store a plurality of split content keys in a plurality of regions in the protected region of the memory, the content key being split into the plurality of the split content keys. The memory device and host device are configured to generate a common key between the host device and the memory device and cut out encryption keys for encryption and decryption of the respective split content keys from the common key. The memory device is configured to encrypt the plurality of split content keys with the encryption keys when the plurality of split content keys are read from the memory and transmitted to the host device. The host device is configured to combine the plurality of split content keys decrypted with the encryption keys and thereby obtain the original content key, and decrypt the content with the content key. The host device is granted access permission to some of the plurality of regions.

FIG. 1 is a block diagram schematically showing a content management system of an embodiment. As shown in FIG. 1, the system comprises a host device 10 including a central processing unit (CPU) 11, a ROM 12, a RAM 13, a card host controller 14, a copyright protection chip 15, a card slot 16 and the like, and a memory card 20 inserted into the card slot 16 and connected to the host device 10.

In the host device 10, the CPU 11 is a processor configured to control the operation of the device and execute a reproduction application 131 loaded from the ROM 12 into the RAM 13.

The card host controller 14 is configured to control communication with the memory card 20 inserted into the card slot 16 and having a copyright protection function. The memory card 20 comprises a data region 21, and content such as music data, image data and video data compressed in advance is recorded in the data region 21 in an encrypted manner. Note that the following description is based on the assumption that the memory card 20 is an SD card having a copyright protection function.

The memory card 20 further comprises a protected region 22 in addition to the data region 21. In the protected region 22, a content key Kt used for content encryption is stored in an encrypted manner, that is, an encrypted content key Kte is stored.

Further, a hard disk drive (HDD) 30 comprises a data region 31 and a protected region 32. To the data region 31 of the HDD 30, the encrypted content stored in the memory card 20 can be copied or moved. Still further, other files can also be stored in the data region 31 of the HDD 30. The protected region 32 of the HDD 30 is a normally inaccessible region but is accessible from the reproduction application 131. In the protected region 32 of the HDD 30, the encrypted content key Kte is stored.

When the reproduction application 131 executes processing such as reproduction of the encrypted content stored in the data region 31 of the HDD 30, the copyright protection chip 15 performs communication with the card host controller 14 and transmits the encrypted content key Kte stored in the protected region 32 of the HDD 30.

The card host controller 14 generates a key for decryption of the encrypted content key Kte, decrypts the encrypted content key Kte with the generated key, and obtains the content key Kt.

Note that the encrypted content key Kte is transmitted from the memory card 20 to the card host controller 14 in mutual authentication processing.

The card host controller 14 comprises a communication controller 141, a card authentication controller 142, a key generation/encryption and decryption circuit 143, and the like.

The communication controller 141 is configured to control communication with the memory card 20. The card authentication controller 142 executes mutual authentication processing by performing communication with the memory card 20, which will be described later. Then, the key generation/encryption and decryption circuit 143 executes decryption processing of the encrypted content key Kte, encryption processing of the content, and the like.

The copyright protection chip 15 comprises a selector 151, a CPU interface 152, a receiving/responding circuit 153, a response resister 154, a response data register 155 and the like. The selector 151 is interposed in a communication line connecting the card slot 16 and the card host controller 14 with each other. When the reproduction application 131 or the like makes access to the content in the memory card 20 inserted into the card slot 16, the selector 151 connects the card host controller 14 and the card slot 16 to establish communication between the card host controller 14 and the memory card 20 inserted into the card slot 16. Still further, when the reproduction application 131 or the like makes access to the content in the HDD 30, the selector 151 connects the card host controller 14 and a circuit in the copyright protection chip 15.

The CPU interface 152 is an interface for performing communication with CPU 11.

The receiving/responding circuit 153 is configured to receive a command from the memory card 20, obtain the response and parameter corresponding to the command from the response register 154 and the response data register 155, and transmit the obtained response to the card host controller 14.

In the response register 154, a command such as data required for the communication with the card host controller 14, that is, data and the like required by a communication standard for making a response is stored. Further, the command stored in the response register 154 is to make a response to the command from the controller 14, that is, to make an acknowledgment of the command from the controller 14. Further, data necessary for decryption of the content stored in the HUD 30 is stored in the response data register 155.

First Embodiment

A content key access method of the first embodiment in the above content management system will be described with reference to the sequence diagram of FIG. 2.

First, in the medium, namely, the memory card 20, content encrypted with the content key Kt is stored in the data region 21, and the content key Kt (in practice, the encrypted content key Kte) is stored in the protected region 22. The card host controller (hereinafter referred to as the host) 14 obtains the encrypted content from the data region 21 of the memory card 20 as well as the content key Kt stored in the protected region 22 of the memory card 20, decrypts the encrypted content with the content key Kt, and uses the content.

In the present embodiment, it is assumed that a content key having a total length of 128 bits (16 bytes) but split into two, namely, split keys of 64 bits (8 bytes) are used. Here, the split keys are respectively called a content key Kt-H and a content key Kt-L, and when content key Kt-H of the high-order 8 bytes and content key Kt-L of the low-order 8 bytes are combined together, the whole content key will be obtained. The protected region 22 of the memory card 20 comprises a plurality of regions, and region identification numbers (protected region numbers) are assigned to the respective plurality of regions.

Note that the protected region 22 may be provided with, for example, 256 or more regions. Further, regions accessible from the host 14 among the plurality of regions are determined by the licenser. That is, regions accessible from the host 14 among the plurality of regions in the protected region 22 of the memory card 20 are set to the host 14 in advance. Still further, in obtaining the content key, the host 14 makes the first read request to a predetermined region.

Since data such as the content key in the protected region 22 is exchanged in an encrypted manner between the host 14 and the memory card 20, it is necessary to calculate a decryption key (that is, an encryption key) to decrypt the encrypted data. When the host 14 makes access to the protected region 22 of the memory card 20, as shown in FIG. 2, authentication processing using elliptic curve Diffe-Hellman key exchange (ECDH) or the like is executed between the host 14 and the memory card 20, and a common bus key is shared between the host 14 and the memory card 20 (step S1). More specifically, the common bus key (of 40 bytes) is calculated in the host 14 and the memory card 20 by using ECDH based on a secret key (random number of 20 bytes) and a public key (of 40 bytes).

Then, a cutout rule is shared between the host 14 and the memory card 20 (step S2). In the processing of sharing the cutout rule, for example, the cutout rule may be determined by the memory card 20 and then notified to the host 14. Here, it is assumed that the cutout position starts from the $A^{th}$ byte and the cutout position is fixed.

Note that the cutout rule may be changed such that a new cutout rule is applied each time the authentication processing is performed. One cutout rule defining that the cutout position starts from the $A^{th}$ byte may be applied when one authentication processing is performed, and when authentication processing is performed again between the host 14 and the memory card 20, another cutout rule defining that the cutout position starts from the $B^{th}$ byte may be applied. Further, the cutout rule may also be changed each time the content key Kt is changed. Rote that the cutout processing in this context includes extraction processing and the like.

Next, when receiving a read request to protected region No. mm storing content key Kt-H in the protected region 22 from the host 14 (step S3), the memory card 20 transmits content key Kt-H in protected region No. mm and a notification that the next read request should be made to protected region No. nn (step S4). At this time, in response to the read request from the host 14, the memory card 20 encrypts the content key with a part of or the whole common bus key and then transmits the encrypted content key to the host 14. The host 14 decrypts the content key with a part of or the whole common bus key in the same manner and uses the read data. For example, when the common bus key calculated in the authentication processing has a length of 40 bytes and if a key having a length of 16 bytes is used for data encryption, an encryption key of 16 bytes is cut out from the $A^{th}$ byte of the common bus key, and the cutout encryption key is used for encryption and decryption of data. The cutout position is fixed by the cutout rule shared in advance between the host 14 and the memory card 20.

Here, in the authentication processing of step S1, a certification given from the licenser is exchanged between the host 14 and the memory card 20. The certification transmitted from the host 14 to the memory card includes protected region number data indicating protected regions to which the licenser permits the host 14 to make access among the plurality of regions in the protected region 22 of the memory card 20. By exchanging the certification, the memory card 20 is notified of regions accessible from the host 14 in the protected region 22.

The following description is based on the assumption that the memory card 20, when being notified that the host 14 can access protected region No. 0, protected region No. 2 and protected region No. 6, stores content key Kt-H in a predetermined protected region to which the host 14 makes the first read request, that is, in protected region No. 0, and stores content key Kt-L in the remaining protected region No. 2 or protected region No. 6. Here, content key Kt-L is assumed to be stored in protected region No. 2.

That is, after the authentication processing is complete, the memory card 20 stores content key Kt-H stored in protected region No. 0 as well as additional data indicating that the other split key, namely, content key Kt-L is stored in protected region No. 2. After the authentication processing is complete, the host 14 makes a read request to protected region No. 0, obtains content key Kt-H and the above-described additional data, and determines that the other split key, namely, content key Kt-L is stored in protected region No. 2. Then, the host 14 transmits a read request to protected region No. nn storing content key Kt-L, namely, protected region No. 2 (step S5) and obtains content key Kt-L from the memory card 20 (step S6). Finally, the host 14 combines the read split keys, namely, content key Kt-H and content key Kt-L with each other, generates the content key Kt, and uses the content key Kt for decryption of the encrypted content. That is, the memory card 20 outputs the content encrypted with the content key Kt to the host 14, and the host 14 decrypts the encrypted content with the content key Kt. In this way, the content is decrypted and becomes available.

Second Embodiment

A content key access method of the second embodiment in the content management system of FIG. 1 will be described with reference to the sequence diagram of FIG. 3. Note that, in FIG. 3, portions the same as those of FIG. 2 will be denoted by the same reference numbers and portions different from those of FIG. 2 will be mainly described.

In the present embodiment, content encrypted with a content key Kt is stored in a memory card 20 in combination with the content key Kt, and a host 14 obtains the encrypted content from the memory card 20 as well as the content key Kt stored in a protected region of the memory card 20, decrypts the encrypted content with the content key Kt, and uses the content in a manner similar to that of the first embodiment.

Also in the present embodiment, it is assumed that a content key having a length of 128 bits (16 bytes) and split into two, namely, split keys of 64 bits (8 bytes) are used.

A protected region 22 of the memory card 20 comprises a plurality of regions, and region identification numbers are assigned to the plurality of regions. Further, in obtaining the content key Kt, the host 14 makes the first read request to a predetermined protected region, but it is assumed that the host 14 makes the first read request to protected region No. mm.

Since data such as the content key in the protected region is exchanged in an encrypted manner between the host 14 and the memory card 20, an encrypted key is cut out from a common bus key calculated in authentication processing and used for decryption of the encrypted data.

For example, when the common bus key calculated in the authentication processing has a length of 40 bytes and if a key having a length of 16 bytes is used for data encryption, an encryption key of 16 bytes is cut out from the common bus key and used for encryption and decryption of data. In the previous embodiment, the cutout position is fixed regardless of the protected region number. However, to further strengthen the access security, the memory card 20 in the present embodiment creates a cutout rule correspondence table and shares the table with the host 14 in step S2A such that the encryption keys for the data stored in different protected regions are cut out from different positions of the common bus key.

That is, when encryption keys for the data stored in different protected regions are cut out from different position of the common bus key, unless the cutout rule is shared with the host 14, the host 14 will have problems encrypting and decrypting the read data. Therefore, after the authentication processing is complete, a correspondence table showing the relationships between protected region numbers and cutout positions of encryption keys used for reading data from the corresponding protected regions is exchanged between the host 14 and the memory card 20. In this way, data stored in different protected regions can be encrypted with different encryption keys and exchanged between the host 14 and the memory card 20, and thus the access security can be increased.

Subsequently, in the processing of steps S3 and S4, the host 14 make a read request to protected region No, mm and obtains content key Kt-H as well as protected region number data indicating the protected region storing the other split key, namely, content key Kt-L. As in the case of the previous embodiment, it is assumed that content key Kt-L is stored in protected region No. nn. The memory card 20 refers to the cutout rule correspondence table exchanged in previous step S2A, determines that the cutout position starts from the $A^{th}$ byte of the common bus key calculated in the authentication processing, and transmits content key Kt-H encrypted with the cutout encryption key together with the number data. Then, the host 14 similarly refers to the cutout rule correspondence table exchanged in previous step S2A, determines that the cutout position of the encryption key necessary for decryption of the data read from protected region No. Mm starts from the $A^{th}$ byte, cuts out the encryption key from the common bus key calculated in the authentication processing, and decrypts encrypted content key Kt-H. In this way, the host 14 obtains content key Kt-H.

In the next step, the host 14 similarly makes a read request to protected region No. nn and obtains content key Kt-L. Here, the memory card 20 refers to the cutout rule correspondence table, determines that the cutout position starts from the $B^{th}$ byte of the common bus key, and transmits content key Kt-H encrypted with the cutout encryption key together with the number data. Then, the host 14 refers to the cutout rule correspondence table exchanged beforehand, determines that the cutout position of the encryption key necessary for decryption of the data read from protected region No. nn starts from the $B^{th}$ byte, cuts out the encryption key from the common bus key calculated in the authentication processing, and decrypts encrypted content key Kt-L. In this way, the host 14 obtains content key Kt-L.

Finally, the host 14 combines the read split keys, namely, content key Kt-H and content key Kt-L with each other, generates content key Kt, decrypts the encrypted content with content key Kt, and uses the content.

Third Embodiment

Figure 4:
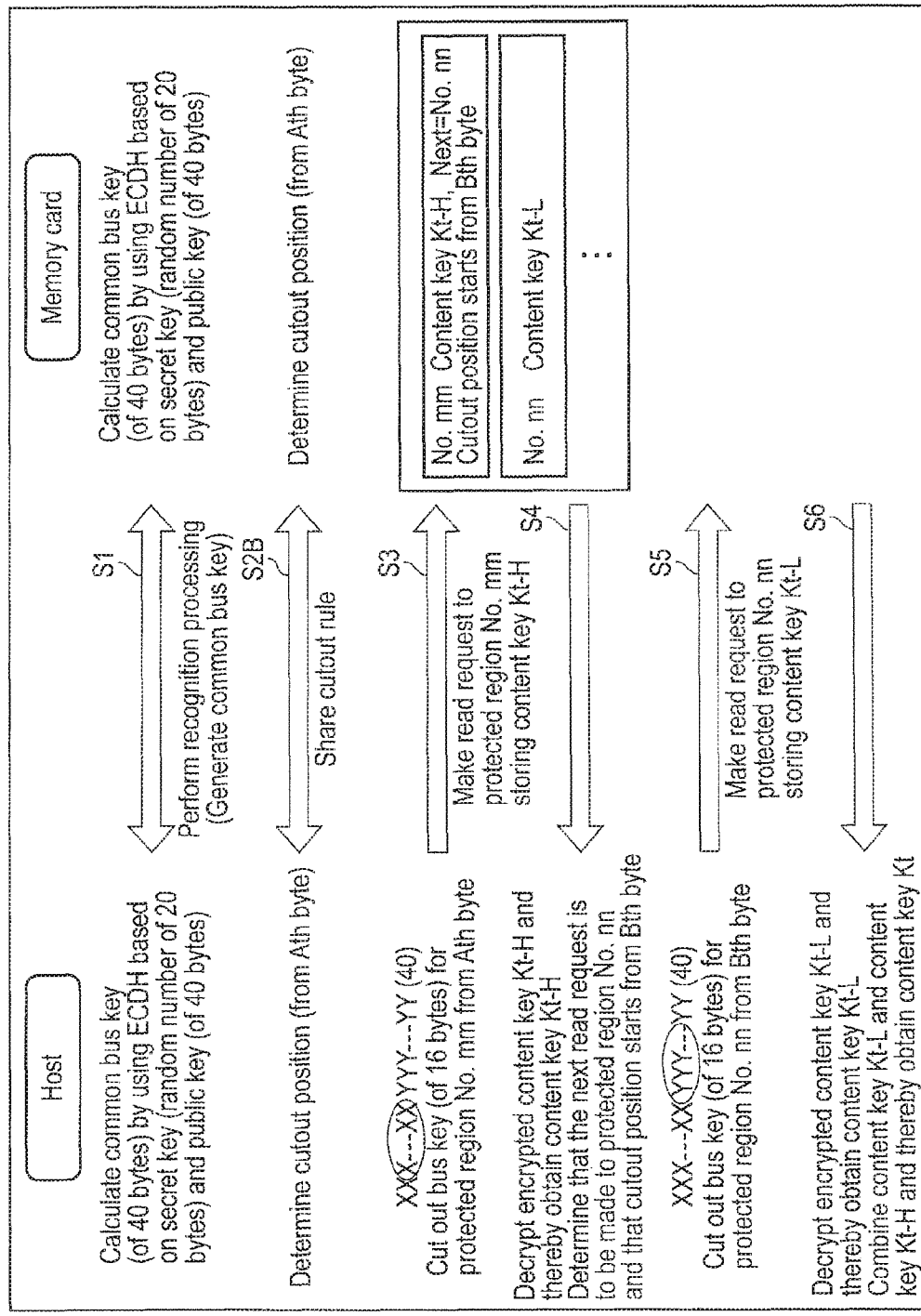
FIG. 4 is a sequence diagram showing a content key access method of the third embodiment in the system of FIG. 1.

A content key access method of the third embodiment in the content management system of FIG. 1 will be described with reference to the sequence diagram of FIG. 4. Note that, in FIG. 4, portions the same as those of FIG. 2 will be denoted by the same reference numbers and portions different from those of FIG. 2 will be mainly described.

In the previous second embodiment, to share a cutout rule between the host 14 and the memory card 20, a cutout position correspondence table showing the relationships between protected region numbers and the cutout positions of the encryption keys used for reading data from the corresponding protected regions is exchanged after the authentication processing is complete.

In the present embodiment, no cutout position correspondence table will be exchanged after the authentication processing, but an initial cutout position is determined in advance (here, the initial cutout position starts from the $A^{th}$ byte (step S2B)). Further, in each protected region, one split content key, the protected region number data indicating the protected region storing the other split key, and the cutout position of the encryption key for the other split key (here, data indicating that the cutout position starts form the $B^{th}$ byte) are stored. In this way, in reading content key Kt-H of step S3, the host 14 is notified that the cutout position of the encryption key necessary for decryption of the other split content key starts from the $B^{th}$ byte. Note that the initial cutout position, namely, the cutout position of the encryption key for protected region No. 0 is assumed to be a specific predetermined position.

Although the above description has been based on the assumption that the content key Kt split into content key Kt-H and content key Kt-L are used, the content key can be generated in a similar manner even when content key Kt is split into three or more.

According to the above-described embodiments, in a content management system for managing a content key and content encrypted with the content key in combination, the content key is not simply stored in a single protected region but the content key is split and separately stored in a plurality of protected regions of a medium. In reading the split content keys, the split content keys are exchanged in an encrypted manner, and at this time, the split content keys are not simply encrypted with an encryption key cut out from a specific fixed portion of a common bus key obtained beforehand in authentication processing between a host device on the read side and the medium, but the split content keys are encrypted with encryption keys cut out from different cutout positions such that content keys stored in different protected regions are encrypted with different encryption keys. Therefore, it is possible to achieve a significantly higher level of security against access to the content key.

While certain embodiments have been described, these embodiments have been presented by way of example only, and are net intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory to be accessed by a host apparatus, the memory comprising:
   first protected region storing a first split content key; and
   a second protected region storing a second split content key, wherein
   the memory is configured to:
      generate the first split content key and the second split content key by splitting a content key used for encryption of content;
      store a common key for the memory and the host apparatus;
      generate a first part common key by cutout of a first part of the common key according to a common cutout rule for the memory and the host apparatus;
      generate a second part common key by cutout of a second part of the common key according to the common cutout rule, the second part being different from the first part;
      encrypt the first split content key by using the first part common key to generate a first encrypted key;
      encrypt the second split content key by using the second part common key to generate a second encrypted key; and
      transmit the first encrypted key and the second encrypted key to the host apparatus.

2. The memory of claim 1, wherein the memory is configured to determine the first part and the second part according to the rule when authentication succeeds between the memory and the host apparatus.

3. The memory of claim 1, wherein the memory is configured to change the first part and the second part corresponding to the first protected region and the second protected region.

4. The memory of claim 1, wherein the memory is configured to write cutout position data of the second part in the first protected region, read the cutout position data of the second part together with the first split content key and use the cutout position data to generate the second part common key.

5. A host apparatus configured to access a memory, wherein:
   when the memory comprises a first protected region storing a first split content key and a second protected region storing a second split content key, and is configured to:
      generate the first split content key and the second split content key by splitting a content key used for encryption of content;
      store a common key for the memory and the host apparatus;
      generate a first part common key by cutout of a first part of the common key according to a common cutout rule for the memory and the host apparatus;
      generate a second part common key by cutout of a second part of the common key according to the common cutout rule, the second part being different from the first part;
      encrypt the first split content key by using the first part common key to generate a first encrypted key;
      encrypt the second split content key by using the second part common key to generate a second encrypted key; and transmit the first encrypted key and the second encrypted key to the host apparatus, the host apparatus is one or more hardware processors connected to the memory, and is configured to:
store the common key;
generate the first part common key by cutout of the first part of the common key according to the common cutout rule;
generate the second part common key by cutout of the second part of the common key according to the common cutout rule;
receive the first encrypted key and the second encrypted key from the memory;
decrypt the first encrypted key by using the first part common key to generate the first split content key;
decrypt the second encrypted key by using the second part common key to generate the second split content key; and
combine the first split content key and the second split content key to generate the original content key.

6. The host apparatus of claim 5, wherein the host apparatus is configured to determine the first part and the second part according to the rule, when authentication succeeds between the memory and the host apparatus.

7. The host apparatus of claim 5, wherein the host apparatus is configured to change the first part and the second part corresponding to the first protected region and the second protected region.

8. The host apparatus of claim 5, wherein when the memory is configured to write cutout position data of the second part in the first protected region, and read the cutout position data of the second part together with the first split content key and use the cutout position data to generate the second part common key, the host apparatus is configured to receive the cutout position data of the second part from the memory and use the cutout position data to generate the second part common key.

9. A content key access method for accessing a content key stored in a memory and used for encryption of content from a host apparatus, the method comprising:

in the memory:
storing a first split content key in a first protected region;
storing a second split content key in a second protected region;
generating the first split content key and the second split content key by splitting the content key;
storing a common key for the memory and the host apparatus;
generating a first part common key by cutout of a first part of the common key according to a common cutout rule for the memory and the host apparatus;
generating a second part common key by cutout of a second part of the common key according to the common cutout rule, the second part being different from the first part;
encrypting the first split content key by using the first part common key to generate a first encrypted key;
encrypting the second split content key by using the second part common key to generate a second encrypted key; and
transmitting the first encrypted key and the second encrypted key to the host apparatus, in the host apparatus:
storing the common key;
generating the first part common key by cutout of the first part of the common key according to the common cutout rule;
generating the second part common key by cutout of the second part of the common key according to the common cutout rule;
receiving the first encrypted key and the second encrypted key from the memory;
decrypting the first encrypted key by using the first part common key to generate the first split content key;
decrypting the second encrypted key by using the second part common key to generate the second split content key; and
combining the first split content key and the second split content key to generate the original content key.

* * * * *